United States Patent
Morrison et al.

[15] 3,659,056
[45] Apr. 25, 1972

[54] HEARING AID SYSTEMS

[72] Inventors: William B. Morrison, 1136 First Avenue, N.W., Moose Jaw; Adolph C. Howorko, 4518 McTavish Street, Regina, both of Saskatchewan, Canada

[22] Filed: Nov. 13, 1969

[21] Appl. No.: 870,588

[52] U.S. Cl. ................................. 179/82, 179/1 B
[51] Int. Cl. ......................................... H04b 5/02
[58] Field of Search ...................... 179/82, 1 B, 107

[56] References Cited

UNITED STATES PATENTS

| 2,530,621 | 11/1950 | Lybarger | 179/82 X |
| 3,125,646 | 3/1964 | Lewis | 179/82 X |
| 3,315,375 | 4/1967 | Heinz | 179/1.1 X |

Primary Examiner—Kathleen H. Claffy
Assistant Examiner—William A. Helvestine
Attorney—Cushman, Darby & Cushman

[57] ABSTRACT

This invention relates to a hearing aid system for the education of deaf children, and permits the incorporation of such children in a class of normal children. The child carries a conventional hearing aid provided with an integral inductive audio-frequency signal pick-up loop. The child also carries an audio-frequency signal inductive transmitting loop of such size that it can be worn in close proximity to the pick-up loop of the hearing aid. The teacher uses a microphone coupled by a suitable transmission system to the inductive transmitting loop. Thus the standard hearing aid enables the child to hear both ambient noise and a relatively distant teacher, with both signals at convenient sound levels.

4 Claims, 6 Drawing Figures

HEARING AID SYSTEMS

This invention relates to improvements in or relating to hearing aid systems, and finds particular application in the education of deaf children.

Two systems are in common use for the teaching of deaf children, namely the use of a microphone by the teacher with an amplifier and earphones worn by the child; and the use of a microphone used by the teacher with an amplifier and an induction loop surrounding the classroom, each child wearing a hearing aid with its own induction pick-up loop. The loop operates at audio-frequencies, and not at radio frequencies.

Each of these systems presents its own problems. Thus if a child wears earphones he cannot possibly hear his own voice when he replies to the teacher, and it has been found that for a child to learn to speak he must be able to hear not only others but also himself. Further, it is desirable that the deaf child should be integrated in a class with children of normal hearing, and since children do not like to be different from other children, the wearing of earphones by the deaf child (in addition to the hearing aid which he also requires) has a bad psychological effect on him as regards to his relationship with the other children.

As regards the use of an induction loop surrounding the classroom, this does enable a standard hearing aid, having a built-in pick-up coil, to be used to pick-up simultaneously the transmission of the teacher's voice from the induction loop through the pick-up coil and the child's own voice through the microphone of the hearing aid. Many modern hearing aids have a three position switch, enabling selection of "loop," of "mike," or of "loop and mike," and older hearing aids having two position switches giving alternatively "loop" or "mike" usually can readily be modified to turn say the "mike" position into "loop and mike." However, the installation of an induction loop around a classroom is relatively expensive and when only one child is involved, and that child must move with the other children from room to room for different lessons, the provision of several classroom loops is hardly practical. Even when several deaf children are involved in the group, "spill" from the loop surrounding one classroom into other adjacent classrooms is difficult to avoid, and this leads to interference between different classes working in adjacent rooms.

An object of the present invention is the provision of an improved hearing aid system suitable for the teaching of partially deaf students.

According to the present invention, a hearing aid system comprises a microphone, an amplifier, a hearing aid adapted to be carried by a user and provided with an integral inductive pick-up loop, an inductive transmitting loop of such size that it can be carried by the user in close proximity to the pick-up loop of the hearing aid, the microphone being connected through the amplifier and a transmission system to the inductive transmitting lop.

The invention will now be described, by way of example, with reference to the accompanying drawings, in which.

Figure 1:
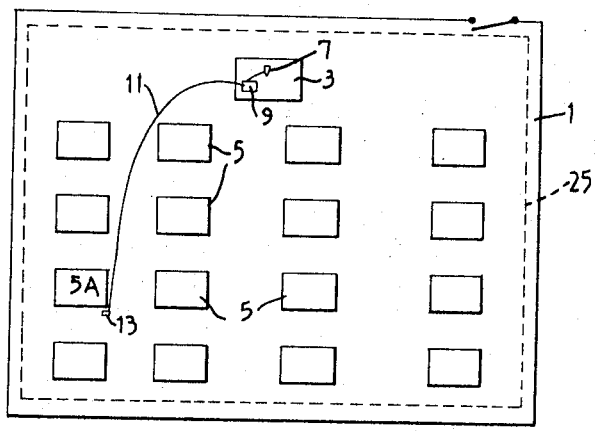
FIG. 1 is a schematic plan view of a classroom in which one hearing aid system according to the present invention is in use.

Referring first to FIG. 1, a classroom 1 contains a teacher's desk 3 and several student's desks 5. For the purpose of the present description, it will be assumed that only one of the children to be taught in the classroom is deaf, and his desk is indicated at 5A. On the desk 3 of the teacher is provided a directional microphone 7 and an amplifier 9 to which the microphone is connected. A flexible lead 11 extends from the output of the amplifier 9 to the student's desk 5A, where it terminates in a connector 13.

Figure 2:
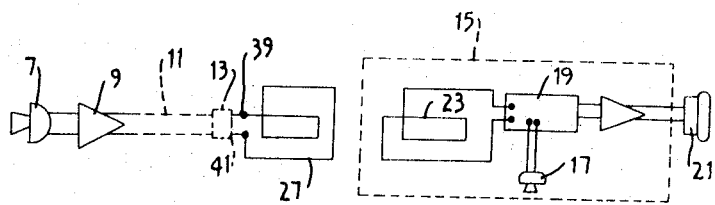
FIG. 2 is a circuit diagram in block form of the hearing aid system of FIG. 1.
Figure 3:
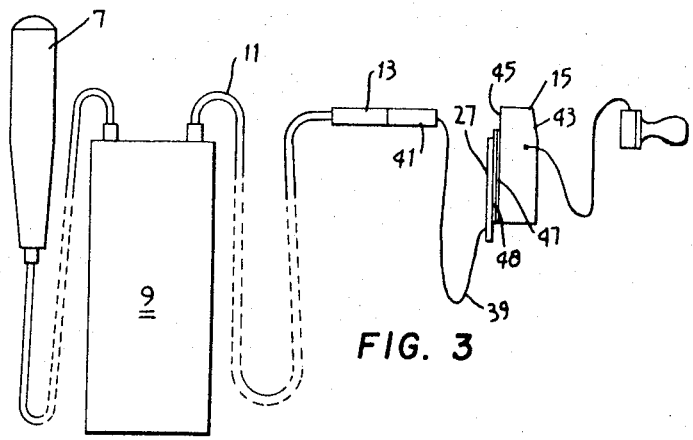
FIG. 3 is a pictorial representation of the components of the hearing aid system of FIG. 2.
Figures 4, 5:
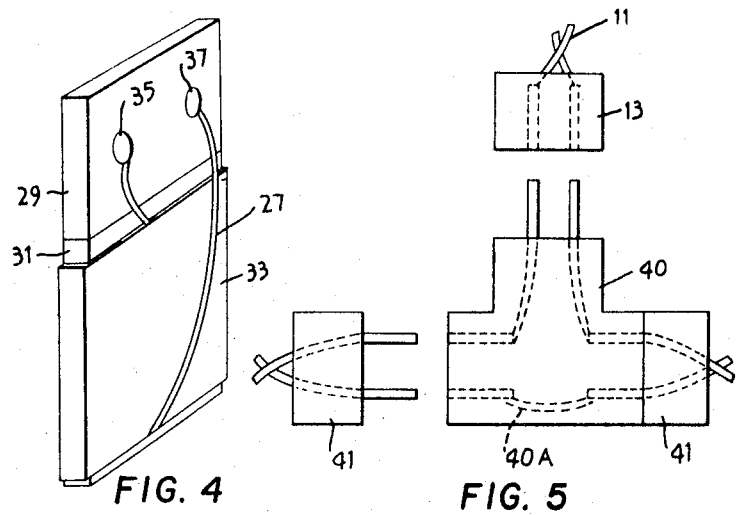
FIG. 4 is a perspective drawing of a personal transmitting inductive loop shown in FIGS. 2 and 3.
FIG. 5 is a pictorial representation of means by which two personal transmitting inductive loops can be operated from a single input.

Referring now to FIGS. 2, 3 and 4, the deaf child who is to sit at desk 5A wears a standard hearing aid 15 having a microphone 17, an amplifier 19, an earphone 21, and an inductive pick-up coil 23. This pick-up coil 23 is integral with the hearing aid case and is physically positioned near the microphone 17. The original purpose of such pick-up coil was to enable the user of the hearing aid to listen to a telephone receiver, not through his microphone, but by inductive pick-up of the electromagnetic radiation at audio-frequencies set up by the "speak" currents in the telephone receiver circuit. It has been found that these coils can also be used to pick up audio-frequency electromagnetic radiation inside a loop carrying audio-frequencycurrents, and this effect has been made use of in the past in teaching, by applying the output from an amplifier such as the amplifier 9 to a room-encircling loop such as the loop 25 in FIG. 1.

However, according to the present invention, the room-encircling transmitting loop 25 is not required, and the lead 11 is coupled instead to a personal transmitting loop 27 work by the child. As shown most clearly in FIG. 4, in the present embodiment of the invention the transmitting loop 27 comprises a ferrite strip 29 having a thickness of ⅛ inch, a width of ¾ inch, and a length of 1 ¾ inches. This strip is wound with a layer of insulating tape 31 and over a length of 1 inch is wound with 30 BWG enamelled wire 33. The remaining part of the strip is used for the mounting of two terminals 35 and 37 to which the two ends of wire 33 are respectively connected. From these terminals extends a flexible lead 39 which terminates in a connector 41 complementary to the connector 13. Although not shown, the wound strip is then covered with a protective layer of insulating tape. The back of the case 43 of the hearing aid 15 is protected with a strip 45 of insulating tape, and two pieces of mating tape 47 and 48 are secured respectively to the case and to the loop 27 to hold and retain the transmitting loop 27 in close proximity to the back of the case 43 adjacent the pick-up coil 23 inside the case. One of these pieces of mating tape is provided with hundreds of small hook-like projections and the other is felt-like in structure. This enables the two pieces to be readily separated.

In use of the apparatus described, the teacher should speak into the microphone 7 from a distance of about 3 inches, since this enables the use of a relatively low "gain" in the amplifier 9 and gives an output on lead 11 with a relatively high signal-to-noise ratio. The output on lead 11 is applied to the personal transmitting loop 27 and the resulting audio-frequency electromagnetic radiation is picked up by the hearing aid pick-up coil 23, amplified in amplifier 19, and applied to the earphone 21. At the same time, ambient noise (including speech by the wearer of the hearing aid 15) is picked up by the hearing-aid microphone 17 and also applied through the amplifier 19 to the earphone 21. The child thus hears both the voice of the teacher, and his own voice, and by the provision of a volume control on the amplifier 9 on the desk 3 of the teacher, an acceptable ratio between the volume of the two voices can be attained. The volume control on the hearing aid can then be used to vary the absolute value of the sound in the earphone 21.

It will be seen that no permanent modification of the hearing aid 15 is required, and the addition of the personal transmitting loop 27 does not affect the normal working of the hearing aid. Thus the aid can be used to hear normal speech, and it can be used, when so desired, to pick up audio signals in a normal room-encircling inductive loop.

As is well known, it is important to match the impedance of a source of electrical power to the impedance of the load. Most amplifiers, radios and like equipment utilizing speakers are adapted to work into a load of 4 ohms, of 8 ohms or of 16 ohms. The transmitting loop should be designed to match the amplifier which is used in the system. The amplifier 9 must supply sufficient power to drive the hearing aid, but since the transmitting loop is so close to the pick-up loop, little power is usually needed. Thus although amplifiers of 15 watts and of 2 watts have been used, it has been found possible to use a battery powered milli-watt amplifier.

When two hearing aids are to be driven by the lead 11, a simple connector can be used to join the two hearing aids. If the required load impedance is say 16 ohms, and each transmitting loop 27 has an impedance of 8 ohms, the two loops can readily be connected in series by use a connector 40 such as that shown in FIG. 5, in which the two leads of lead 11 are connected respectively to the two loops and the second ends of the two loops are connected together at 40A. On the other hand, if the required load impedance is say eight ohms, it may be necessary to use a matching transformer. Conveniently a tapped matching transformer or network could be provided in, or in conjunction with, the amplifier 9 together with a calibrated rotary switch so that the teacher could simply set the switch to the number of hearing aids to be driven by the amplifier.

For the teaching of many subjects, it would be advantageous for the teacher to be able to move about the room during instruction, and to this end either the lead from the microphone 7 to the amplifier 9 can be long and flexible, or the amplifier can be made small and transportable and be carried by the teacher, for example by a shoulder strap.

Figure 6:
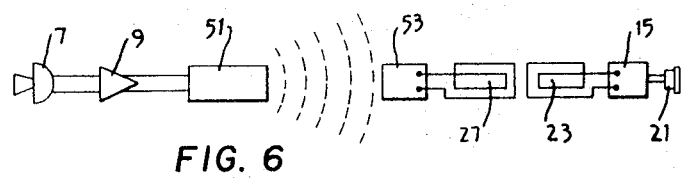
FIG. 6 is a circuit diagram equivalent to FIG. 2 but showing an alternative hearing aid system according to the present invention.

Both of these measures involve the use of trailing leads, and FIG. 6 illustrates an alternative arrangement in which the lead 11 is replaced by alternative communication means in the form of a radio transmitter 51 and a radio receiver 53. The radio transmitter 51 includes the amplifier 9 and is modulated by the microphone 7 which can be built-in if desired, while the output from the radio receiver is used to energize the loop 27.

By the present invention it is possible to couple any of a number of devices, for example a television set, a radio, a microphone, a record player, and a tape playback machine, alternatively to a standard hearing aid with no modification to the hearing aid except the taping-on of the transmitting loop. Most hearing aids when operating from their integral microphone have low sensitivity to low frequency sounds, and yet in the partially deaf the residual hearing usually is in the low frequency range. On the other hand, low frequency sounds are readily passed on by the transmitting loop to the pick-up coil of the hearing aid. It is of course necessary that the microphone used by the teacher shall have a good low frequency response and that the associated amplifier shall also be capable of handling faithfully these low frequency signals, but this is much easier to achieve in a microphone and an amplifier of the size and power visualized that in the very small equivalent parts used in a modern hearing aid.

The ability of the hearing aid to be used without modification to pick up signals from a room loop is important, since the child can at home rely on a room loop to provide sound input from a television set, tape recorder or a radio set without the encumbrance of the trailing lead 11. In the usual case of a single child in a school or a class suffering from partial deafness, microphone 7, amplifier 9 and lead 11 are small enough, simple enough and light enough for the child himself to carry them from classroom to classroom, and to set them up for the use of the teacher in two or three minutes. This makes the system much more acceptable to the teachers.

We claim:
1. A hearing aid system comprising:
   a. a microphone;
   b. an amplifier arranged to receive an input from said microphone;
   c. a radio transmitter modulated by an output of said amplifier;
   d. a hearing aid adapted to be carried by a user;
   e. an inductive audio-frequency-signal pick-up loop forming an integral part of said hearing aid;
   f. an audio-frequency-signal inductive transmitting loop of such size that it can be carried by a user of the hearing aid in close proximity to said pick-up loop;
   g. a radio receiver complementary to said radio transmitter and arranged to receive an output from the transmitter;
   h. said radio receiver being of such size that it can be carried by the said user; and
   i. said radio receiver being arranged to demodulate an input radio signal and to apply audio frequency signals to said inductive transmitting loop.

2. A hearing aid system according to claim 1 and in which said inductive transmitting loop is attached to said hearing aid in the proximity of the said pick-up loop.

3. A hearing aid system according to claim 1 and in which said inductive transmitting loop is in the form of a coil wound on a ferrite former.

4. A hearing aid system according to claim 3, and in which the ferrite former is in the form of a strip and the coil is wound around a longitudinal axis of said strip.

* * * * *